BRISTOL & JACKSON.
Car Wheel.
No. 8,751. Patented Feb. 24, 1852.
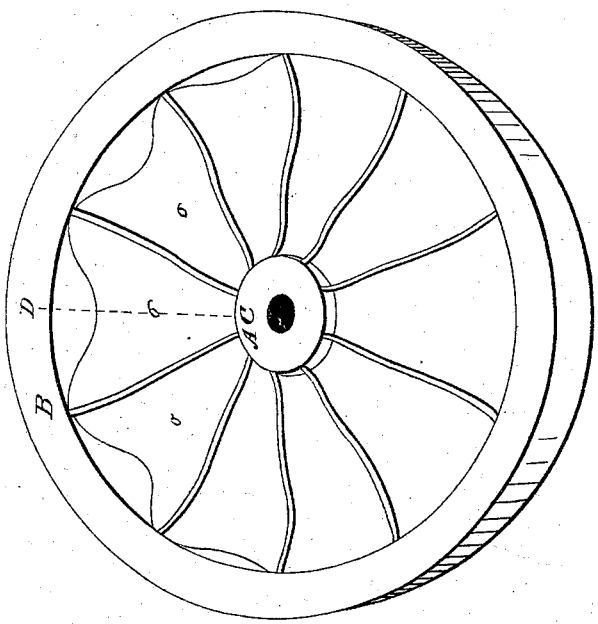
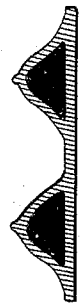
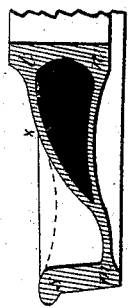
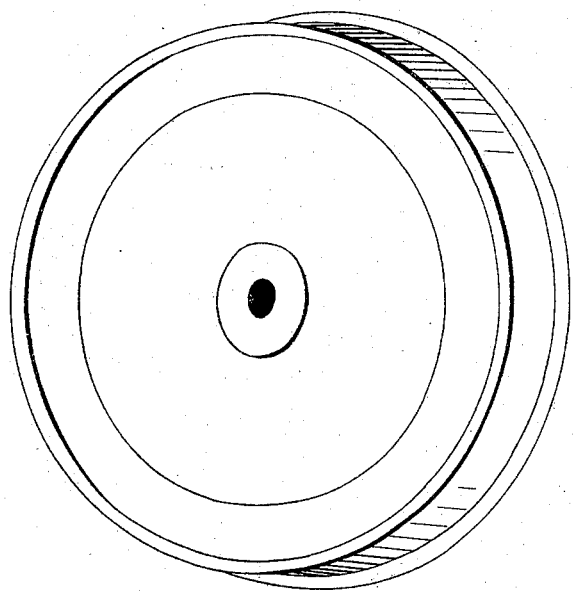
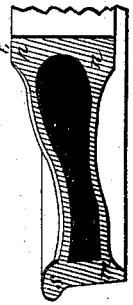

UNITED STATES PATENT OFFICE.

ALBERT G. BRISTOL AND JOEL C. JACKSON, OF ROCHESTER, NEW YORK.

CAST-IRON CAR-WHEEL.

Specification of Letters Patent No. 8,751, dated February 24, 1852.

*To all whom it may concern:*

Be it known that we, ALBERT G. BRISTOL and JOEL C. JACKSON, both of Rochester, in the county of Monroe and State of New York, have invented a new and Improved Car-Wheel; and we do hereby declare that the following is a full and exact description thereof, reference being had to the accompanying drawings and to the letters of reference marked thereon.

Figure 1 is a drawing of the front or face side of the wheel. Fig. 2 is a drawing of the reverse of the wheel. Fig. 3 is a drawing of a section from hub to rim in the direction indicated by the letters A, B, on Fig. 2. Fig. 4 is a section in the direction indicated by the letters C, D on Fig. 2. Fig. 5 shows part of a section concentric with the rim and indicates the connection of the plates with the rim.

The hub we make solid. On the face side a plate connects the hub with the rim which is made in the form shown in Fig. 1 or more particularly at $m$, $n$, in Figs. 3 and 4. This plate has its center depressed nearly an inch where it is united to the hub. It consequently presents a flattened arch whose extremities rest upon the circumference of the wheel and whose keystone (so to speak) is the hub.

The back of the wheel is made by a plate spreading from the hub and curved so as to meet and join the face plate at the points $o$, $o$, $o$ in Figs. 2 and 4. Between these points the plate is continued, in a somewhat folded or ruffled form, uniting with the face plate until it meets and joins the rim. The form of this plate and its connections with the face plate where they both meet the rim is shown in Fig. 5. Upon this plate ribs are added as shown in the drawing Fig. 2.

Double plate wheels have been made in which the two plates have been connected either interruptedly, at points about equidistant from hub and tread as in those patented by B. Severson and H. Wiser, or a complete and continuous junction has been made as in that patented by Isaac Van Kuren in 1849 or 1850. In all of these the plates have been united with the tread upon or very near to its inner and outer edges and consequently the center of the tread upon which the bearing mainly is has been left unsupported. All wheels of this kind have been found liable to split and that whether bracketed upon the inside or not. To obviate this difficulty wheels have been proposed with two plates starting from the hub and curved toward each other so as to meet before reaching the tread and thence continued in a single plate. This single plate has been corrugated so as to cross and recross the tread of the wheel from edge to edge. Examples of this form of wheel are to be found in that patented by Anson Atwood and in one designed by Carmi Hart. The strength of a wheel depends greatly upon its being so constructed that its different parts shall cool equally and alike. When a wheel is formed with two plates extending from the hub to the tread these must necessarily be cast over a core. Now a core is made principally of sand whose capacity for and retention of heat is well known. The heavier body of metal which is in the tread is partially cooled by coming in contact with the chill and when the wheel is taken from the mold and buried in dry sand, as is usual, the cooling process goes on very slowly and equally. If however the wheel be partly double plate and partly single plate, that part in which the core is, will retain more heat, the cooling be unequal and the wheel liable to crack at the point where the double plate merges into the singles. In the wheel which we present the two plates it will be seen are continued from hub to tread, one of them being so corrugated as to cross and recross the tread to prevent splitting, but yet forming with the front plate, triangular cavities through which radiating portions of the core pass, thereby retaining the heat and equalizing and retarding the cooling process. This is perhaps the most important point in which our wheel differs from others, but we think it also differs in this that while in other wheels the two plates are made to curve in opposite directions—when they must antagonize each other and the yield be confined to the flattening (if any be possible) of the short arches between hub and tread—in this it will be observed that the front and back plates both have a curvature in the same direction. As they contract they do not antagonize each other but rather act together to throw the hub forward. The arrangement of the back plate in its manner of connection with the rim and with the face plate, while, as we have said, it guards the rim from all danger of splitting or of breaking across, at the same time forms braces to the face plate. This is seen in Fig. 4 at $o$, $x$.

What we claim as our invention and desire to secure by Letters Patent is—

The making of car wheels with double plates extending from the hub to the tread— the plate forming the face of the wheel to be slightly curved backward so that a section of it through the center shall present a very flat arch whose extremities abut against the rim of the wheel—the back plate as it spreads from the hub to be curved in the same direction as the front plate, but as it approaches the tread, to be gradually depressed at equal intervals, till it meets the front plate—to be thus thrown into a fold or plait forming two walls of a triangular cavity of which the third side is made by the face plate, and in this form to be continued till it meets and unites with the tread—the whole to be in manner and form substantially as shown in the accompanying drawings.

A. G. BRISTOL.
J. C. JACKSON.

Witnesses:
JOHN H. GLASS,
WILLIAM McGOWAN.